United States Patent
Gheith et al.

(10) Patent No.: US 10,372,679 B2
(45) Date of Patent: *Aug. 6, 2019

(54) FILE VERSIONS WITHIN CONTENT ADDRESSABLE STORAGE

(71) Applicant: International Business Machines Corporation, Armonk, NY (US)

(72) Inventors: Ahmed Gheith, Austin, TX (US); Eric Van Hensbergen, Austin, TX (US); James Xenidis, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 248 days.

This patent is subject to a terminal disclaimer.

(21) Appl. No.: 15/270,506

(22) Filed: Sep. 20, 2016

(65) Prior Publication Data

US 2017/0011058 A1    Jan. 12, 2017

Related U.S. Application Data

(63) Continuation of application No. 14/098,773, filed on Dec. 6, 2013, now Pat. No. 9,495,373.

(51) Int. Cl.
*G06F 7/00* (2006.01)
*G06F 17/30* (2006.01)
(Continued)

(52) U.S. Cl.
CPC .......... *G06F 16/1727* (2019.01); *G06F 3/064* (2013.01); *G06F 3/067* (2013.01);
(Continued)

(58) Field of Classification Search
CPC .. G06F 17/30138; G06F 3/0608; G06F 3/064; G06F 3/0647; G06F 3/067; G06F 17/30109; G06F 17/30194
(Continued)

(56) References Cited

U.S. PATENT DOCUMENTS 5,724,573 A    3/1998 Agrawal et al.
5,742,811 A    4/1998 Agrawal et al.
(Continued)

FOREIGN PATENT DOCUMENTS

CN    1777853 A    5/2006
CN    101189573 A    5/2008
(Continued)

OTHER PUBLICATIONS

Jiang, "Design and Implementation of File System for Content Aware Storage Device", B.E. (Hubei University of Police) 2006, Thesis paper, South-Central University for Nationalities, May 2009. 55 pages.
(Continued)

*Primary Examiner* — Binh V Ho
(74) *Attorney, Agent, or Firm* — Daniel Yeates

(57) ABSTRACT

A request to access to a logical location in a file stored in a content addressable storage (CAS) system can be processed by retrieving first tree data from a first node in a first hash tree that represents a first version of the file. Based on the first tree data, a second node is selected from which a CAS signature is compared to a reserved CAS signature to determine the proper file version. In response to a match, a third node is accessed in a second hash tree that represents a second version of the file. Tree data is retrieved from a third node.

20 Claims, 9 Drawing Sheets

(51) Int. Cl.
*G06F 16/17* (2019.01)
*G06F 16/13* (2019.01)
*G06F 16/14* (2019.01)
*G06F 16/182* (2019.01)
*G06F 3/06* (2006.01)

(52) U.S. Cl.
CPC .......... *G06F 3/0608* (2013.01); *G06F 3/0647* (2013.01); *G06F 16/13* (2019.01); *G06F 16/152* (2019.01); *G06F 16/182* (2019.01)

(58) Field of Classification Search
USPC ........................................................ 707/723
See application file for complete search history.

(56) References Cited

U.S. PATENT DOCUMENTS

| | | | |
|---|---|---|---|
| 5,893,086 A | 4/1999 | Schmuck et al. | |
| 7,539,838 B1 | 5/2009 | Todd et al. | |
| 7,673,099 B1 * | 3/2010 | Beaverson | G06F 12/0866 711/118 |
| 7,992,037 B2 | 8/2011 | Dubnicki et al. | |
| 8,095,558 B2 | 1/2012 | Barley et al. | |
| 8,271,751 B2 * | 9/2012 | Hinrichs, Jr. | G06F 11/1441 707/639 |
| 8,443,000 B2 | 5/2013 | Auchmoody et al. | |
| 8,621,240 B1 * | 12/2013 | Auchmoody | G06F 21/6272 707/640 |
| 2007/0157002 A1 | 7/2007 | Zelikov et al. | |
| 2007/0174662 A1 | 7/2007 | Zelikov et al. | |
| 2009/0228511 A1 * | 9/2009 | Atkin | G06F 16/116 |
| 2010/0095064 A1 * | 4/2010 | Aviles | H04L 67/1097 711/118 |
| 2010/0174690 A1 * | 7/2010 | Marcotte | G06F 16/178 707/695 |
| 2011/0138123 A1 * | 6/2011 | Gurajada | G06F 16/284 711/118 |
| 2011/0307659 A1 | 12/2011 | Hans et al. | |
| 2011/0320642 A1 | 12/2011 | Shitomi et al. | |
| 2012/0084263 A1 | 4/2012 | Gosnell | |
| 2012/0124046 A1 * | 5/2012 | Provenzano | G06F 3/0605 707/737 |
| 2012/0317395 A1 | 12/2012 | Segev et al. | |
| 2013/0036091 A1 * | 2/2013 | Provenzano | G06F 3/0604 707/624 |
| 2013/0042083 A1 | 2/2013 | Mutalik et al. | |
| 2013/0275391 A1 * | 10/2013 | Batwara | G06F 16/125 707/689 |
| 2013/0275656 A1 * | 10/2013 | Talagala | G06F 12/0246 711/103 |
| 2015/0161153 A1 | 6/2015 | Gheith et al. | |
| 2015/0161154 A1 | 6/2015 | Gheith et al. | |

FOREIGN PATENT DOCUMENTS

| | | |
|---|---|---|
| CN | 101425096 A | 5/2009 |
| CN | 101853190 A | 10/2010 |
| CN | 102063267 A | 5/2011 |

OTHER PUBLICATIONS

Selvaprakash, V., et al., "Improving Content Addressable Storage for Databases", Department of Computer Sciences, University of Wisconsin, Madison, WI, Conference on Reliable Awesome Projects, 2008, http://pages.cs.wisc.edu/~remzi/Classes/736/Spring2008/Projects/VandhanaBrandon/final_paper.pdf 8 pages.

Gheith, et al., "Files Having Unallocated Portions Within Content Addressable Storage", U.S. Appl. No. 15/270,462, filed Sep. 20, 2016.

* cited by examiner

US 10,372,679 B2

FILE VERSIONS WITHIN CONTENT ADDRESSABLE STORAGE

BACKGROUND

This disclosure relates to data systems that store files with unpopulated portions. In particular, it relates to access to files within a system that provides content addressable storage, which can store files having multiple version histories.

Content addressable storage (CAS) allows for data to be stored using identifiers that are generated from the content of the data. This allows for the data to be retrieved using these identifiers without knowledge of a physical address within the storage device. For instance, when a file (or data object) is stored in a CAS system, the CAS system can generate a signature that uniquely identifies the file content, at least in a statistical sense. The CAS system can also specify the storage location for each identifier. This type of address is sometimes referred to as a content address.

Two or more data blocks that have identical data content (whether the data blocks are duplicates of one another, or incidentally contain the same data) will result in the same signature being generated for the files. Retrieval of the data content for any of these files will use this common signature. Thus, a single location can store the data for multiple data objects and CAS system can reduce the storage space consumed by files, and particularly for data backups and archives. CAS systems also facilitate authentication of files. For instance, due to there being only one copy of a file, verifying legitimacy of the file can be simplified.

SUMMARY

Embodiments are directed toward a method for processing a request to access to a logical location in a file stored in a content addressable storage (CAS) system. The method includes retrieving first tree data from a first node in a first hash tree that represents a first version of the file. The first tree data includes a first hash tree depth, a first CAS signature, a block size and a file size. Based on the first tree data, a second node is selected from a higher level in the first hash tree. Second tree data is retrieved from the second node in the first hash tree that represents the first version of the file. The second tree data includes a second CAS signature. The second CAS signature is determined to match the reserved CAS signature and, in response to determining the second CAS signature matches the reserved CAS signature, a third node in a second hash tree that represents a second version of the file is retrieved. Third tree data is retrieved from a third node in the second hash tree. The third tree data includes a third hash tree depth, a third CAS signature, the block size and the file size. Based on the third tree data, the second hash tree is traversed.

Various embodiments are directed toward a method for generating content addressable storage (CAS) signatures for different versions of a file. The method includes generating a first hash tree for a first version of the file. The first hash tree has a first root CAS signature that is encoded with a depth for the first hash tree, a block size for the first hash tree and a file size for the file. A second hash tree is generated for a second version of the file by: categorizing, relative to corresponding blocks in the first version of the file, a first set of one or more blocks in the second version of the file as modified and a second set of one or more blocks in the second version as unmodified, generating a first level of CAS signatures for the second hash tree by: applying a hash function to the first set of one or more blocks categorized as modified, and applying a common CAS signature to the second set of one or more blocks categorized as unmodified; and generating a second root CAS signature from the first level of CAS signatures, the second root CAS signature encoded with a depth for the second hash tree, a block size for the second hash tree and a file size for the file.

A system for generating content addressable storage (CAS) signatures for different versions of a file. The system includes a client device configured with a client interface module that is designed to: retrieve first tree data from a first node in a first hash tree that represents a first version of the file, the first tree data including a first hash tree depth, a first CAS signature, a block size and a file size; select, based on the first tree data, a second node from a higher level in the first hash tree; retrieve second tree data from the second node in the first hash tree that represents the first version of the file, the second tree data including a second CAS signature; determine that the second CAS signature matches the reserved CAS signature; retrieve, in response to determining the second CAS signature matches the reserved CAS signature, a third node in a second hash tree that represents a second version of the file; retrieve third tree data from a third node in the second hash tree, the third tree data including a third hash tree depth, a third CAS signature, the block size and the file size; and traverse, based on the third tree data, the second hash tree.

The above summary is not intended to describe each illustrated embodiment or every implementation of the present disclosure.

BRIEF DESCRIPTION OF SEVERAL VIEWS THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments of the invention and do not limit the disclosure.

Figure 1:
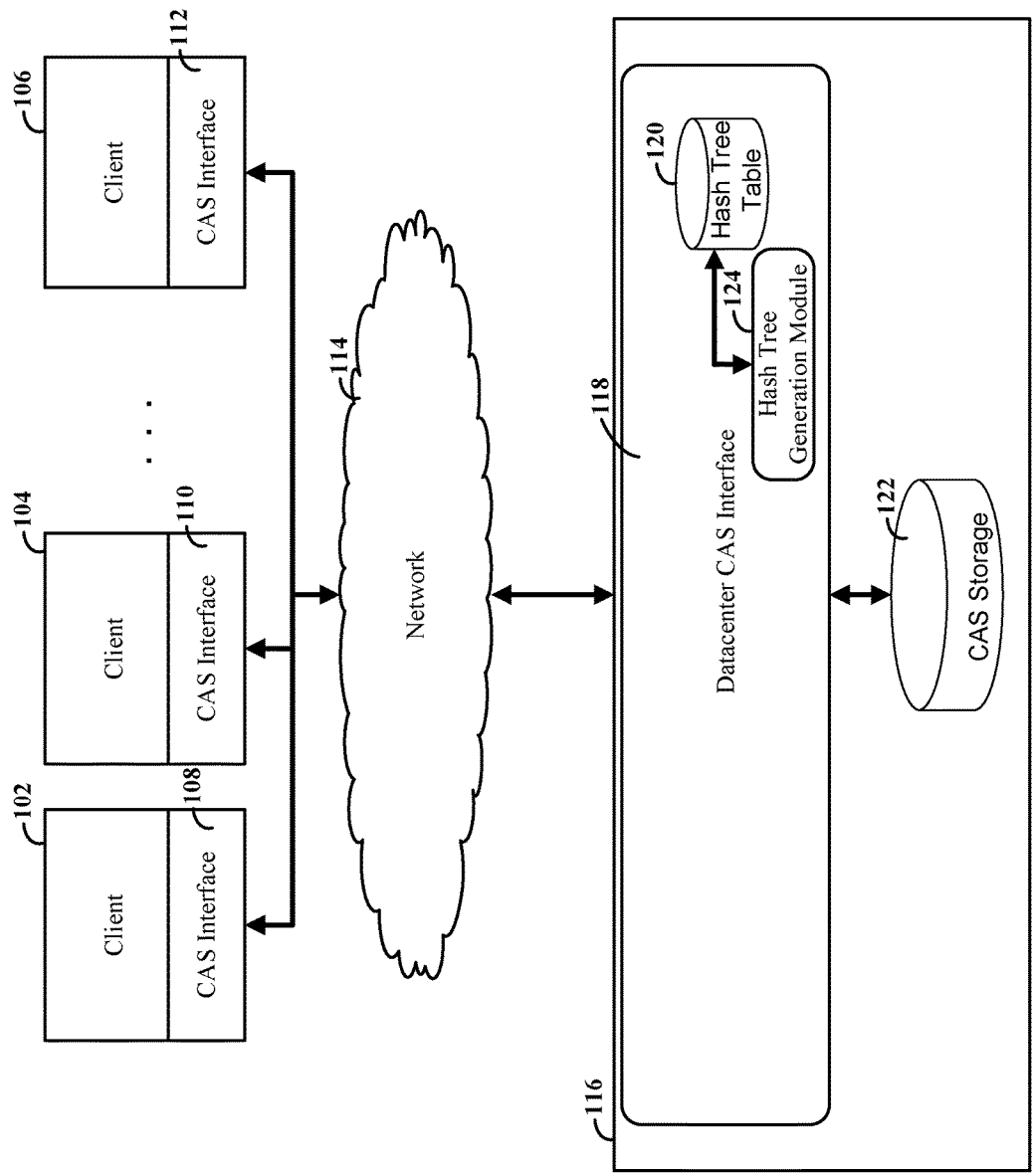
FIG. 1 depicts a CAS storage system, consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to content addressable storage, more particular aspects relate to content addressable storage for files with unpopulated portions. While the present invention is not necessarily limited to such applications, various aspects of the invention may be appreciated through a discussion of various examples using this context.

Consistent with various embodiments of the present disclosure, a content addressable storage (CAS) system can be configured to generate a signature (hash) tree for a single file or data object. The hash tree can be constructed from multiple signatures of different portions (blocks) of a single file or data object. Particular embodiments relate to the use of a specified (reserved) signature to represent data blocks that do not contain data that is meaningful (e.g., relative to the use of the file). Retrieval of data objects can be facilitated by traversing the hash tree, while monitoring for the reserved signature.

Certain embodiments are directed toward encoding additional information with signatures contained in the hash tree. This additional information can include information that facilitates traversal of the hash tree from a starting hash node to a final hash (leaf) node that identifies the desired data. For instance, the additional data can contain information such as hash tree depth, file size and block size. Using this information, the requesting device can traverse the hash tree until it encounters a reserved signature or is provided with the requested data block. When encountering a reserved signature, the device can cease the tree traversal and end the corresponding request for data. This can be useful for reducing amount of data transferred between the requesting device and the CAS system.

Various embodiments are directed toward accessing (storing, modifying or reading) files that can be relatively sparse in their populated content. For instance, disk images can contain data corresponding to a file system of an operating system (e.g., where the disk image is created for backup purposes). The file system can specify that portions of the disk are unallocated file space. While the corresponding physical storage location of the disk can contain data, this data is not required to recreate the system image. For instance, data for a system image can be retrieved from a storage device, such as a hard disk drive. The system may have used/allocated less than half of the available disk drive space. The unallocated portions will return binary data values if accessed; however, the embodiments of the present disclosure build upon the recognition that these values are not relevant for many applications. Accordingly, embodiments are directed toward a CAS system that uses a hash tree to identify unallocated or unpopulated portions of a file.

Embodiments of the present disclosure are directed toward a CAS system that accounts for different versions of a file being stored in the CAS system. When a new version of a file is stored, a created hash tree may contain only minor differences from the older version(s) of the file. Accordingly, embodiments are directed toward categorizing blocks that are unchanged between subsequent versions so that reserved signatures can be placed within the hash tree for corresponding blocks. A requesting device that traverses the hash tree of a particular version of a file may encounter a reserved signature. In response, the requesting device can traverse the hash tree of a previous version of the file or access a locally cached copy of the previous version of the file. The process can be repeated until the data for the requested block is retrieved or the requesting device encounters a reserved signature in the original version of the file, which can signify that the data is unallocated.

Although the likelihood of a collision with a particular reserved signature and actual data in a file can be statistically improbable (with proper selection of the hash function), certain embodiments allow for the use of collision avoidance when generating a hash tree. For instance, the system can monitor the output of a hash function to detect a collision (match) with the reserved signature. If a match is detected, the system can apply an additional algorithm to modify the signature so that it no longer matches the reserved signature. In certain embodiments, the additional algorithm could simply apply a second, predetermined signature that is reserved for collisions; however, a more complex algorithm could also be applied, such as applying a second hash function to the signature. If the system is designed to validate the data, the validation algorithm can also include this collision detection and solution so that it can also (re)generate the proper signature.

Turning now to the figures, FIG. 1 depicts a CAS storage system, consistent with embodiments of the present disclosure. Clients 102, 104, 106 can be configured to access a CAS data center 116 using CAS interface modules 108, 110, 112. Network 114 can be used to route data between clients and the data center. The network can include, but is not necessarily limited to, one or more local area networks (LANs), one or more wide area networks (WANs), the Internet and combinations thereof. The data center 116 can interface with the clients 102, 104, 106 using a datacenter CAS interface module 118, which can interface with one or more hash tree tables 120 and CAS storage devices 122. In certain embodiments, the clients can cache local copies of a tree table or portions of a tree table.

Consistent with various embodiments, the CAS storage system can contain a number of additional components and be configured in a variety of manners. For instance, one or more computers or servers can be configured to interface with the datacenter and with one or more clients. The computers can be configured to provide functionality such as, but not necessarily limited to, web-based access and portals, backup functions, archival functions, searching capability, system image generation, user authentication, image/file authentication and combinations thereof. For ease of discussion and illustration, FIG. 1 may not expressly show each possible configuration.

Consistent with embodiments, the datacenter CAS interface module 118 can include a hash tree generation module 124, which can be configured to generate a content addressable storage (CAS) signature for a file having allocated and unallocated blocks. For instance, the file can be a system or disk image for a computer system. The hash tree generation module can generate a first level of CAS signatures by applying a one way (hash) function to allocated blocks. The output of this function can be binary numbers that are used as a set of CAS signatures. A few examples of a one way function include message digest algorithms (MD5) and secure hash algorithms (SHA-1 or SHA-2). Other functions and hashes are possible. As discussed herein, the one-way functions generate signatures that are statistically unique relative to the data content of a corresponding block. Thus, while collisions between signatures may be theoretically possible, the generated signatures can be considered unique in that the probability of a collision is sufficiently low (e.g., much less likely than data errors from other sources).

The hash tree generation module can use additional data for the file to identify the unallocated blocks. As discussed in more detail herein, the unallocated blocks can include those blocks for which none of the data contained therein is allocated. In place of a hash function, the hash tree generation module can use or apply a common (reserved) CAS signature to each unallocated block. For instance, the common CAS signature could be all binary zeroes. Other binary numbers can be used for the common CAS signature included, for example, a randomly generated CAS signature. While it is theoretically possible that the common CAS signature may result in a collision with a particular allocated data block, the hash function can be selected such that probability of this is acceptably low.

The hash tree generation module can then encode the first level of CAS signatures with additional information. This additional information can be selected to facilitate traversal of the hash tree that is being generated. For instance, the additional information can include a hash tree depth for the first level of CAS signatures, a block size and a file size.

The hash tree generation module can next generate a second level of one or more CAS signatures by combining the first level of CAS signatures into groups. The groups can include two or more CAS signatures. In some embodiments, the number of CAS signatures that are combined can depend upon the desired tree depth, file size and block size. A hash function is then applied to the groups of combined CAS signatures. In certain embodiments, the hash function can be the same hash function that was applied to the original data blocks. Embodiments allow for different hash functions to be used at different levels. The client CAS interface modules can be provided with information that allows for the proper hash function to be used at each level.

As discussed herein, when a group contains all unallocated blocks (e.g., the group contains only reserved/common signatures), the common CAS signature propagates to the next level. Thus, the hash tree generation module can apply the common signature to the group with the unallocated blocks. The hash tree generation module can then encode the second level of CAS signatures with the additional information (e.g., a hash tree depth for the first level of CAS signatures, a block size and a file size). This process can be iterated to generate additional levels of the hash tree and until a single signature is generated for a tree level. The single signature can be referred to as the root signature because a client CAS interface module that has the root signature can access any data block by traversing the hash tree.

Consistent with certain embodiments, the client CAS interface module can be configured to retrieve data from the content addressable storage (CAS) system. The retrieved data can correspond to a request for access to a logical location in a file, which can be received from another device, a program running on the client device or other sources. The client CAS interface module can retrieve data about the hash tree in order to traverse the appropriate hash tree. For instance, the client CAS interface module can retrieve the root signature that represents the appropriate file and decode information stored in a header of the root signature (or otherwise encoded therewith). This information can include tree data such as the hash tree depth, the client CAS signature (or score), the block size for the hash tree and the file size.

The client CAS interface can then use the retrieved information to traverse the hash tree by selecting a second (child) signature and its header from a higher level in the hash tree. For instance, knowing the block size, the tree depth and the file size allows the client CAS interface to determine the path through the hash tree that leads to the desired data block. The client CAS interface can then compare the second CAS signature to the reserved CAS signature, which indicates that all child signatures (from higher levels in the tree) of the second CAS signature are unallocated. If there is a match, the client CAS interface can provide the requesting program or devices with an indication that the requested logical location is unallocated within the file. If there is no match, the client CAS interface can retrieve either a CAS signature from the next level or the requested data (if there are no more levels in the hash tree).

Embodiments of the present disclosure are directed toward generating content addressable storage (CAS) signatures for different versions of a file. The data center CAS interface, using a hash tree generation module, can generate a first hash tree for a first version of the file, consistent with the discussions herein. This first hash tree can have a first root CAS signature that is encoded with a depth for the first hash tree, a block size for the first hash tree and a file size for the file. When a new, second version of the file is received, the data center CAS interface can generate a second hash tree for a second version of the file that accounts for commonalities and differences between the file versions. For instance, the data center CAS interface can categorize blocks in the second version of the file as either modified or unmodified, relative to a corresponding block in the first version of the file. A first level of CAS signatures for the second hash tree can include signatures for both modified and unmodified blocks. The signatures for the modified blocks can be generated by applying a hash function to the blocks. The signatures for the unmodified blocks can be generated by applying a common/reserved CAS signature (e.g., all binary zeroes). Additional levels of CAS signatures can be generated in a similar manner until a second root CAS signature is created. Each of the CAS signatures, including the second root CAS signature, can be encoded with a depth for the second hash tree, a block size for the second hash tree and a file size for the file. Accordingly, the leaves of the hash tree can each contain a score or signature, a hash tree depth, a block size and a file size.

Certain embodiments are directed toward the use of a reserved signature to denote both (or either) unallocated file blocks and unmodified file blocks. When the client CAS interface encounters the reserved signature, it can traverse back through hash trees of previous versions until it either finds an unreserved signature or reaches the original version (in which case the corresponding block would be unallocated in the requested version of the file and in all previous versions).

Various embodiments allow for the use of two different reserved signatures, one that indicates that the block is unallocated and another that indicates that the block is unmodified. For instance, if a block is both unallocated and unmodified (e.g., it was unallocated in both versions of the file), then the block can be marked as unallocated. When a client CAS interface encounters the signature for unallocated blocks, it can stop traversing the hash tree(s). When a client CAS interface encounters a signature for unmodified blocks, it can begin traversing the hash tree for the previous version of the file and continue accordingly.

Figure 2:
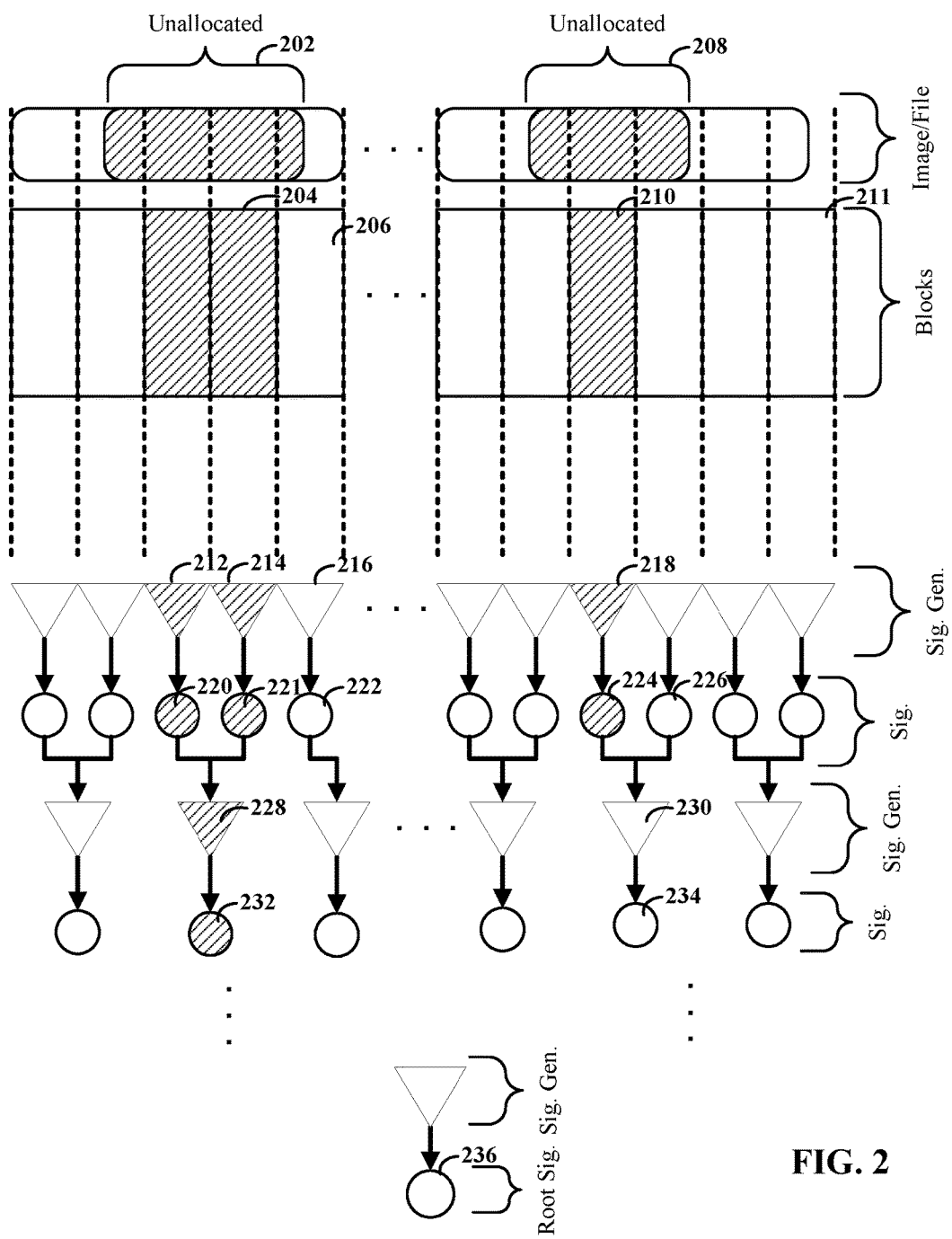
FIG. 2 depicts a logical flow diagram for generating a hash tree, consistent with embodiments of the present disclosure.

FIG. 2 depicts a logical flow diagram for generating a hash tree, consistent with embodiments of the present disclosure. As discussed herein, a file (e.g., a disk image) can contain one or more unallocated portions 202, 208, which are indicated by the shaded portions. These may correspond, for example, to locations on a disk that are marked as free or unused by the corresponding file system(s). The file can be broken into different blocks according to a desired blocks size. These blocks can be categorized as either allocated (un-shaded) 206, 211 or unallocated (shaded) 204, 210 based upon the portion that they represent. As shown by block 206, a block that contains both allocated and unallocated data can be categorized as allocated.

Each of the blocks can then be transformed into a signature using signature generation functions. For allocated blocks, the data contents can be input into a signature generator (un-shaded functional block 216) that uses a one-way (hash) function to generate a corresponding signature (un-shaded signatures 222, 226). For unallocated blocks, a signature generator (shaded functional block 212, 214, 218) can output a (predetermined) reserved signature (shaded signatures 220, 221, 224). These signatures can be collectively stored as the first, or highest, level of the hash tree.

Two (or more) of these signatures can then be combined to create the next level of the hash tree. For instance, if each of the signatures being combined to make up the next level are unallocated (as shown by shaded signatures 220, 221), then the corresponding signature generator (shaded functional block 228) can output the reserved signature (shaded signature 232). If at least one of the signatures being combined is allocated (as shown by un-shaded signature 226), then the combined signatures can be input into a signature generator (un-shaded functional block 230) that uses a one-way (hash) function to generate a corresponding signature (un-shaded signature 234). This process can be repeated until a single root signature is generated (un-shaded signature 236).

Consistent with embodiments, the signature generators can be configured to encode additional data into a header of each signature (or each node of the hash tree). As discussed herein, the encoded signature can contain the depth within the hash tree, the block size for the hash tree, the file size of the file and the score from the one-way (hash) function.

Figure 3:
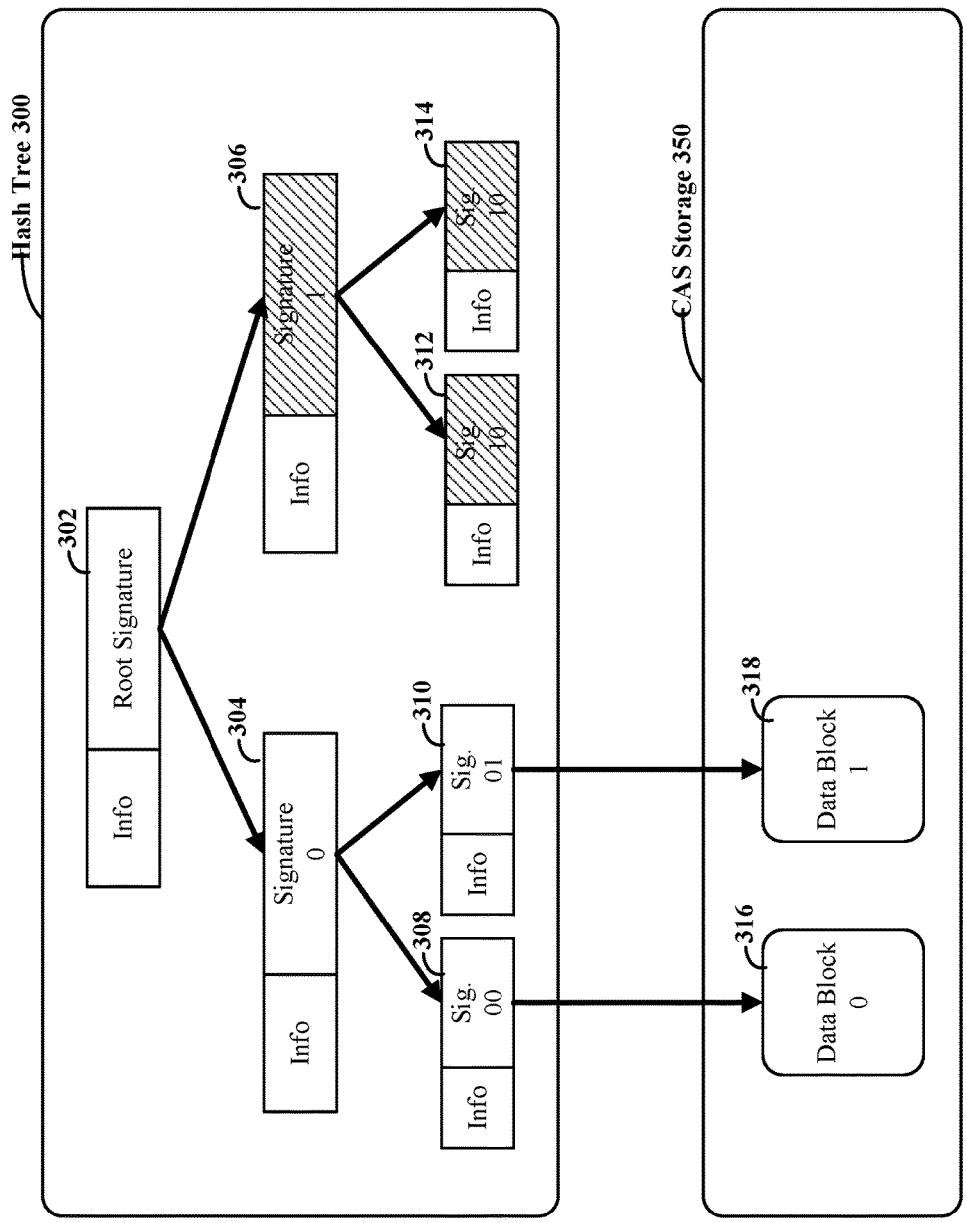
FIG. 3 depicts logical mapping between a hash tree and data stored in CAS storage, consistent with embodiments of the present disclosure.

FIG. 3 depicts logical mapping between a hash tree and data stored in CAS storage, consistent with embodiments of the present disclosure. Hash tree 300 corresponds to data stored in CAS storage 350. The hash tree includes a root signature 302, which can be used to identify a file or image which contains a plurality of data blocks 316, 318. The root signature 302 is at a first level and is linked with second level signatures 304, 306, which are linked with the third level signatures 308, 310, 312, 314. The third level signatures represent the leaf node level of the hash tree and are linked to a corresponding allocated data blocks 316, 318.

Consistent with embodiments, shaded signatures 306, 312, 314 represents signatures that correspond to one or more unallocated data blocks. Accordingly, signatures 306, 312, 314 can contain a common (reserved) signature that is not linked to data stored within CAS storage 350. When a client CAS interface module seeks data blocks corresponding to either of signatures 312 and 314 it can begin with the root signature 302. From there, the client CAS interface module can traverse the hash tree to signature 306. The client CAS interface module can compare the signature 306 to the reserved signature. If a match is found, the client CAS interface module can stop the traversal because the block being sought is unallocated. This can save processing time and data bandwidth, relative to traversing the entire hash tree.

Figure 4:
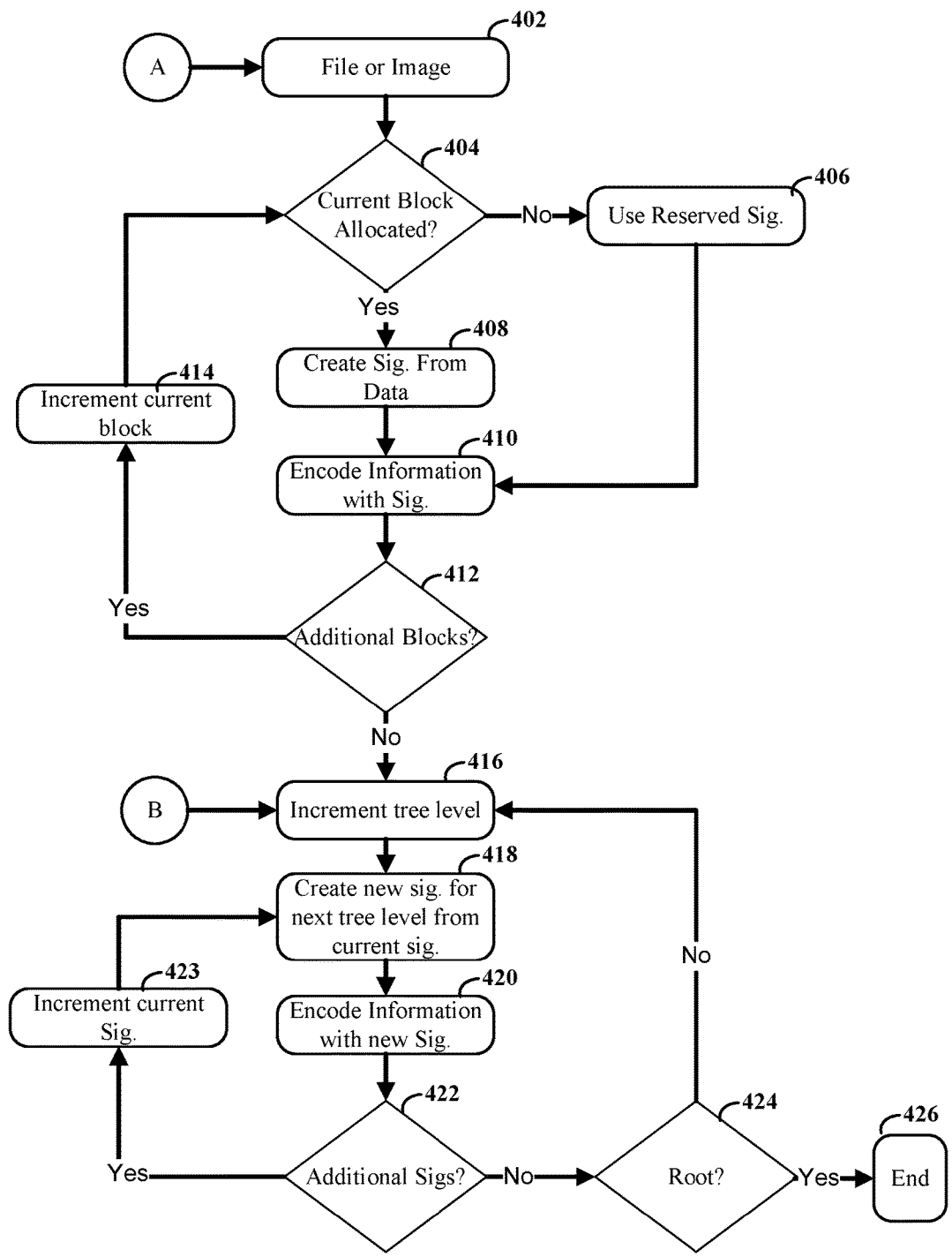
FIG. 4 depicts a flow diagram with nodes representing elements useful for generating a hash tree for a file with allocated and unallocated portions, consistent with embodiments of the present disclosure.

FIG. 4 depicts a flow diagram with nodes representing elements useful for generating a hash tree for a file with allocated and unallocated portions, consistent with embodiments of the present disclosure. A hash (tree) generation module can process a received image file 402. According to some embodiments, the image file can be an image of a storage device, such as a disk drive. As discussed herein, the image file can be processed as data that is divided into a plurality of blocks. To begin, the first block in the image can be set as the current block. The hash generation module can determine whether or not the current block is allocated, per node 404. This determination can include, for instance, obtaining information from a file system directory, metadata and similar sources.

If no portion of the current block is allocated, then the hash generation module can use a reserved signature to represent the block, per node 406. In certain embodiments, this reserved signature can be a predetermined signature bit value, such as all zeroes. It is also possible that the reserved signature is generated by the hash generation module or provided from another source. In instances where the reserved signature is not known ahead of time, the reserved signature can be provided to client CAS interface modules once it is known.

If at least a portion of the current block is allocated, then the hash generation module can apply a one-way function to the data contained in the block to generate a signature for the block, per node 408. Additional information (file size, block size, tree depth) can then be encoded with the signature to generate a corresponding node of the hash tree, per node 410.

The hash generation module can next determine whether or not there are additional blocks in the file or image, per node 412. If there are additional bocks, then the next block can be set to the current block by incrementing the current block, per node 414. If there are no additional blocks, then the hash generation module can advance to the next level of the hash tree by incrementing the current tree level, per node 416.

The leaves of the next tree level can be generated by combining multiple signatures from the prior level and applying a one-way function to the data contained in combination, per block 418. Additional information (file size, block size, tree depth) can then be encoded with the signature to generate a corresponding node of the hash tree, per node 420.

The hash generation module can next determine whether or not there are additional signatures in the prior tree level, per node 422. If there are additional signatures, then the current next signature can be updated to include the next signature(s) by incrementing, per node 423. A new signature for a corresponding node can be generated by repeating nodes 418 and 420. This process can be repeated until all signatures in the prior tree level have been processed and there are no additional signatures in the prior level.

The hash generation module can determine whether or not the root level of the hash tree has been reached, per node 424. If not, then the tree level can be incremented, per node 416, and a new level can be generated for the hash tree. If root level has been reached, then the hash tree can end the tree generation, per node 426.

Figure 5:
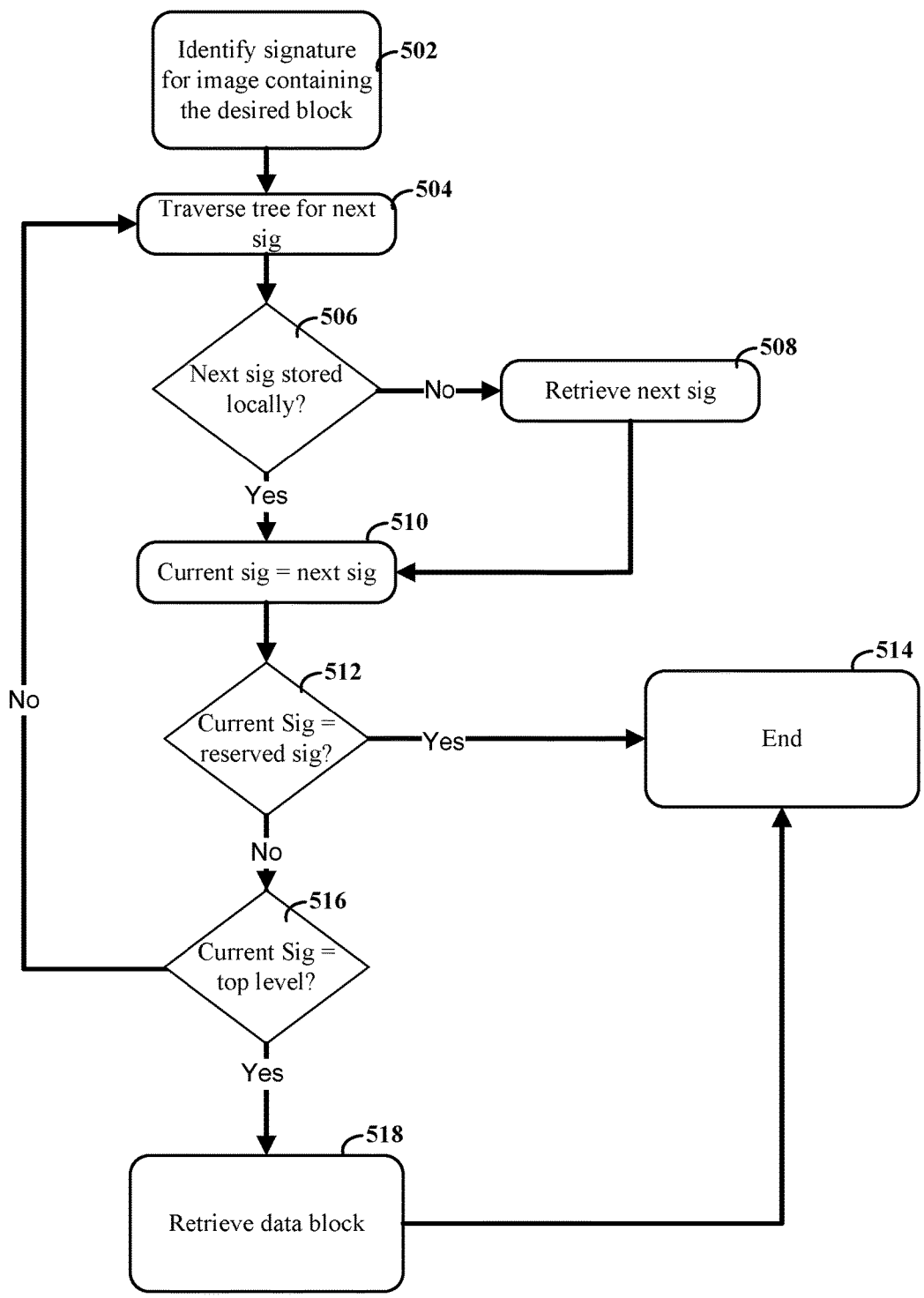
FIG. 5 depicts a flow diagram with nodes representing elements useful for traversing a hash tree to obtain data from a file with allocated and unallocated portions, consistent with embodiments of the present disclosure.

FIG. 5 depicts a flow diagram with nodes representing elements useful for traversing a hash tree to obtain data from a file with allocated and unallocated portions, consistent with embodiments of the present disclosure. When a client device desires one or more portions of a file or image, the client device determines or identifies the corresponding signature for the desired portion, per node 502. For instance, the client device may seek a file that is contained in the Nth block of an image file for a hard disk drive. The client device can then identify and retrieve the root signature for an image corresponding to the particular hard disk drive.

From the identified signature, the client device can begin traversing the hash tree associated with the identified signature, per node 504. For instance, the appropriate signature can be determined from the additional information encoded in the first identified signature. As an example, the client CAS interface module can determine which path in the hash tree corresponds to the desired Nth block from information about the file size, the block size and the tree depth. The CAS system can return the appropriate hash tree signature from the next level.

In certain embodiments, the client CAS interface module can be configured to store a local (cached) copy of hash trees. For example, the client CAS interface module can cache a local copy by storing information obtained from traversing a particular hash tree. Accordingly, the client CAS interface module can first determine whether or not the next signature (along the determine path) is stored locally, per node 506. If so, the client CAS interface module can use the signature from local storage. If not, the client CAS interface module device can retrieve the next signature from the CAS signature, per node 508. This retrieve can include sending, to the CAS system, a request that identifies the appropriate location for the signature in the next level of the hash tree.

The client CAS interface module can then increment the current signature being analyzed to be the next signature, per node 510. The client CAS interface module can then determine whether or not the current signature is equal to the reserved signature (representing unallocated block(s)), per node 512.

If the current signature is equal to the reserved signature, then the desired Nth block is unallocated and there is no relevant data to be obtained from the block. Accordingly, the flow can end, per node 514. This can be useful for saving processing resources, time and communication bandwidth because the full tree does not necessarily have to be traversed and because the actual data contained within the unallocated block does not need to be transferred. Further savings can be obtained if the relevant portions of the hash tree are cached locally.

If the signature is not equal to the reserved signature, then the client CAS interface module can determine whether or not the current signature is at the top level (and there are not additional hash tree levels to traverse), per node 516. If not, then the client CAS interface module can return to node 504 to further traverse the hash tree.

If the current signature is at the leaf/top level of the hash tree, then the client CAS interface module can retrieve the actual data for the Nth data block, per node 518. The process of retrieving the Nth data block can the end, per node 514.

Figure 6:
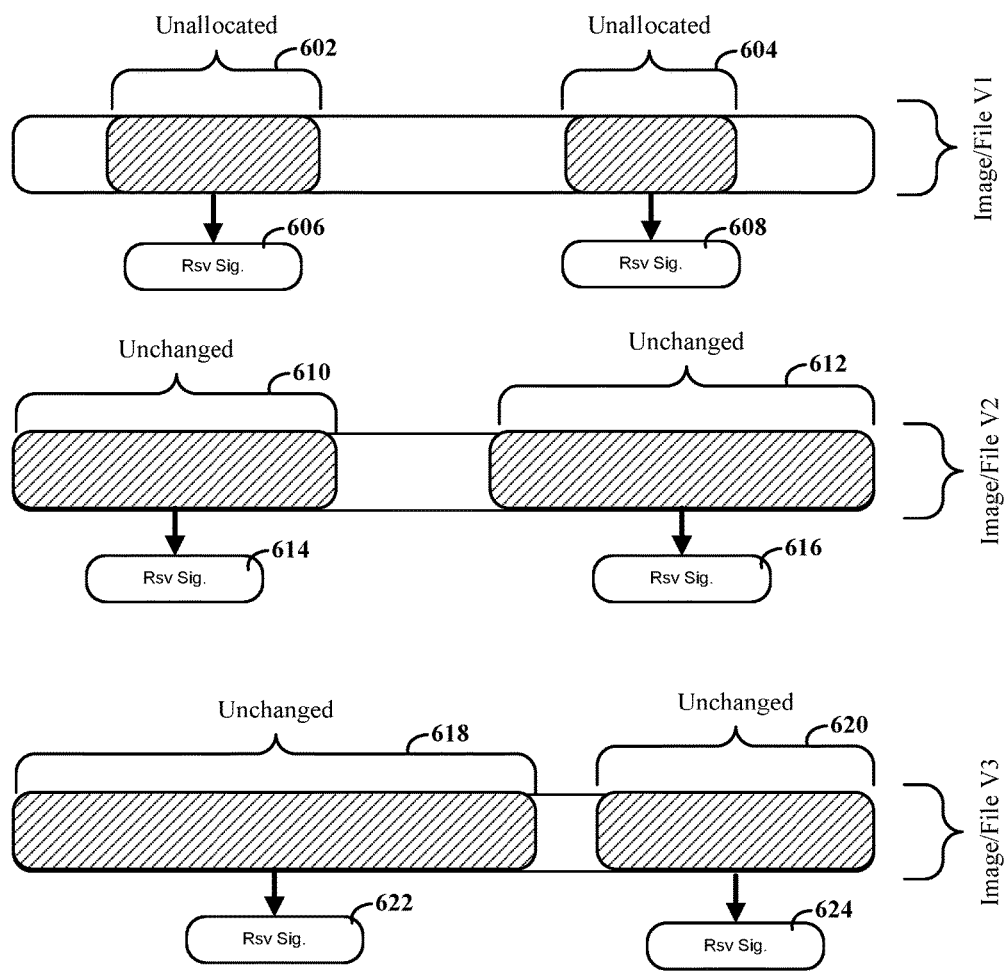
FIG. 6 depicts a block diagram of a file or image with multiple versions, consistent with embodiments of the present disclosure.

FIG. 6 depicts a block diagram of a file or image with multiple versions, consistent with embodiments of the present disclosure. Certain embodiments are directed toward the use of reserved hash tree signatures in combination with different versions of the same file. It has been recognized that in addition to, or separate from, unallocated portions of a file, different versions of the same file can often contain significant amounts of unchanged data.

For instance, multiple versions of an image of a hard disk drive can be stored as part of a periodic or continuing backup procedure. The first image file can be denoted as version 1 (V1). V1 might contain unallocated portions 602, 604. When the V1 is stored in a CAS system, the resulting hash tree can be constructed to include reserved signatures (606, 608) for blocks containing only data from these unallocated portions.

When a second version (V2) of the file is saved in the CAS system, it may contain sections of data 610, 612 that are identical to the first version. Consistent with embodiments of the present disclosure, the hash tree for V2 can be constructed to include reserved signatures 614, 616 for blocks that do not contain any new data. When a third version (V3) of the file is saved to the CAS system, it may have sections of data 618, 620 that are unchanged relative to V2. The hash tree for V3 can use reserved signatures 622, 624 for blocks that do not contain any new data.

The root signatures for the different versions of the file can be used by a requesting client device to obtain data for the desired version. For instance, a client device may be provided with a root signature for a new version of a file. The client device may already have a local copy of the previous version of the file. When the client device seeks data from the new version of the file, it can use the corresponding root signature to traverse the hash tree of the newer version. When the client device encounters a reserved signature during the traversal, this can indicate that the desired content is the same in both versions of the file. This can be particularly useful for allowing the client device to use a local copy of the older version of the file for portions that are identical in both versions, while still being able to obtain changed portions from the CAS storage.

Figure 7:
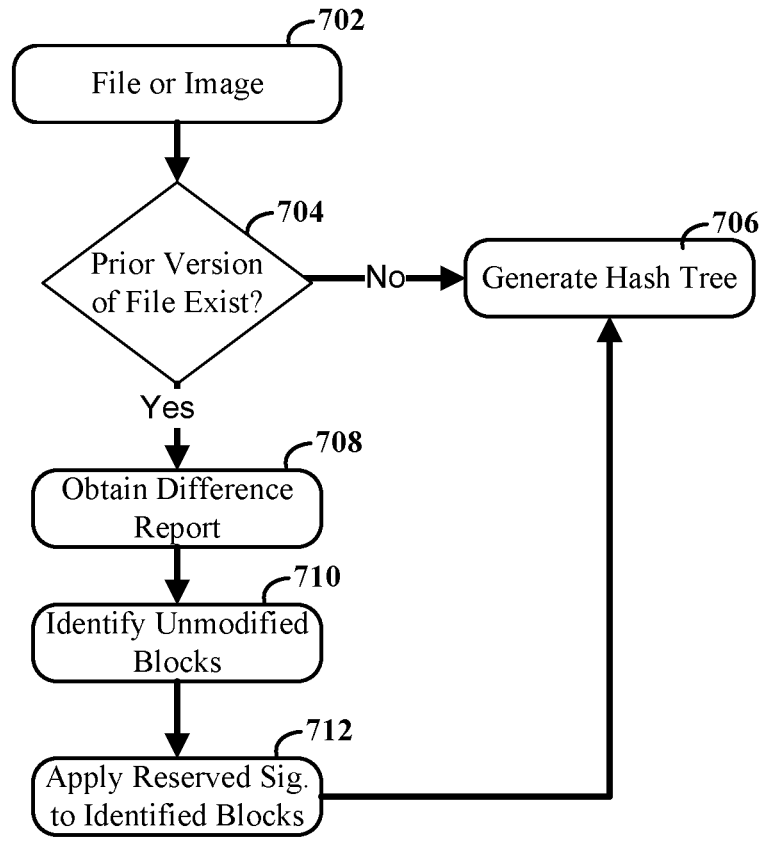
FIG. 7 show a flow diagram containing nodes representing elements useful for generating a hash tree for a file with multiple versions, consistent with embodiments of the present disclosure.

FIG. 7 shows a flow diagram containing nodes representing elements useful for generating a hash tree for a file with multiple versions, consistent with embodiments of the present disclosure. When a file or image 702 is received for storage in the CAS system, a hash (tree) generation module can determine whether or not the file has one or more prior versions already stored in the CAS system, per node 704. This determination can be made a number of different ways depending upon the particular application. For instance, the program that provides the image for storage can also provide a root signature for a prior version of the file. In other instances, the CAS system can create a table that includes metadata that helps to define version histories for files.

If CAS system does not contain a prior version, then a hash tree can be generated, per node 706. In some embodiments, the generation of the hash tree can be carried out without the use of reserved signatures. In other embodiments, the generation of the hash tree can be carried out using reserved signatures for unallocated portions of the file (e.g., proceeding from node A in FIG. 4).

If the CAS system does have a prior version of the file, then the CAS system can obtain a difference report, per node 708. In some embodiments, the difference report can be obtained directly from the received version of the file. For instance, systems that use incremental backups for disk images can be configured to provide a partial data file containing only those portions of the image that changed relative to the prior version. Accordingly, the CAS system can determine which blocks have changed based on whether or not (new) data was provided for a particular group of blocks.

In some instances, only a portion of a block may be changed while the hash tree generation is accomplished on a per block basis based upon both the changed and unchanged data. Consistent with certain embodiments, the system providing the partial file can include data for an entire block if any of the data therein is changed. Various embodiments allow for the CAS system to supplement the partial file by retrieving unchanged data for a block with only a portion of the data being provided by the incremental backup system.

Based upon the difference report obtained from node 708, the CAS system can identify those blocks that have not been modified, per node 710. The CAS system can then apply reserved signatures to the identified blocks, per node 712. This can also include the encoding of additional information, consistent with the various discussions herein. The CAS system can then generate the remainder of the hash tree consistent with the various teachings herein. For instance, the hash tree can be generated by continuing at node B in FIG. 4, where the reserved signatures represent unmodified portions and can propagate to higher levels of the tree as discussed herein. In other instances, the hash tree can be generated by continuing at node A in FIG. 4. In such instances, additional reserved signatures can be added for unallocated portions of the file. The reserved signatures can thereby represent blocks of data that are either unmodified (relative to a prior file version), unallocated (relative to a file system) or both.

Figure 8:
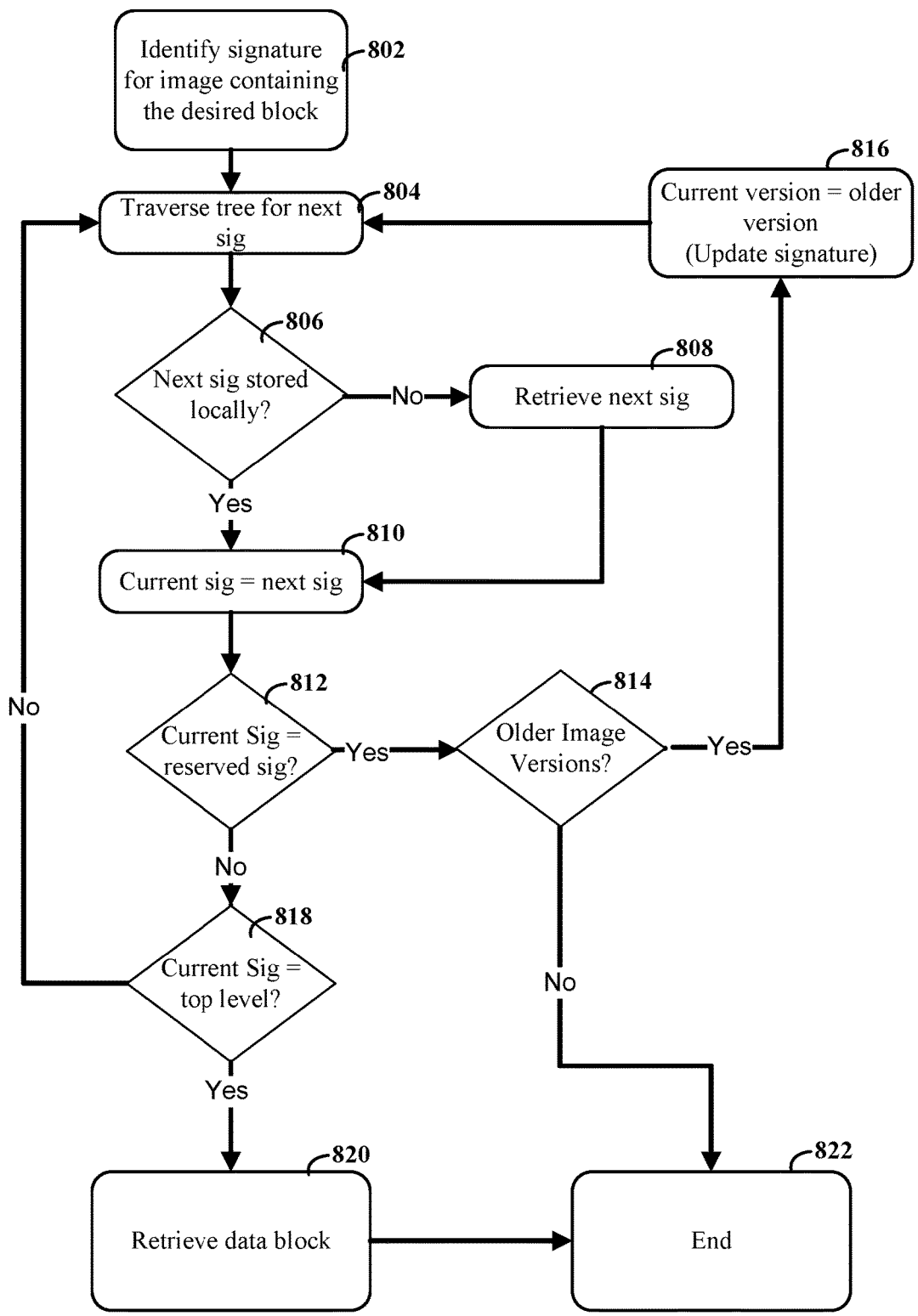
FIG. 8 depicts a flow diagram with nodes representing elements useful for traversing a hash tree to obtain data from a file with allocated and unallocated portions, consistent with embodiments of the present disclosure.

FIG. 8 depicts a flow diagram with nodes representing elements useful for traversing a hash tree to obtain data from a file with allocated and unallocated portions, consistent with embodiments of the present disclosure. When a client CAS interface module seeks to retrieve a data block from a CAS system, it can first identify the signature for image containing the desired block, per node 802. This can include, for instance, identifying not only the desired file, but also the desired version of the file. The client CAS interface module may have multiple root signatures for the same file, wherein the root signatures each represent a different version of the file.

The client CAS interface module can then begin traversing the hash tree corresponding to the identified signature, per node 804. As discussed herein, this traversal can include the identification of the next signature from the next level of the hash tree, which might be stored in a local cache of the hash tree. Accordingly, the client CAS interface module can determine whether or not the next signature is stored locally, per node 806. If not, the client CAS interface can retrieve the next signature from the CAS system, per node 808.

Whether the next signature is obtained from a local cache or the CAS system, the client CAS interface module can update the current signature to be that of the next signature, per node 810. The client CAS interface module can then determine whether the (now updated) current signature is a reserved signature, per node 812. If so, then this indicates that the requested block is either unchanged or unallocated (or both if the reserved signature is used for both unchanged and unallocated blocks). Accordingly, the client CAS interface module can determine whether or not there is a previous or older version of the file or image, per node 814. If there is an older version, then this older version can be set as the current version by identifying and using a signature for the older version, per node 816. The hash tree for this signature can then be traversed per node 804. If there is not an older version then this may indicate that the block is unallocated (or that there is a problem with the hash tree), and the retrieval can end, per node 822.

If the current signature is not a reserved signature, then the client CAS interface module can determine whether or not the current signature is the leaf, or top, level of the hash tree, per node 818. If not, then the client CAS interface module can continue traversing the hash tree, per node 804. If so, then the current signature can be used to retrieve data from the CAS storage system, per node 820. The retrieval process for this block can then end, per node 822.

Figure 9:
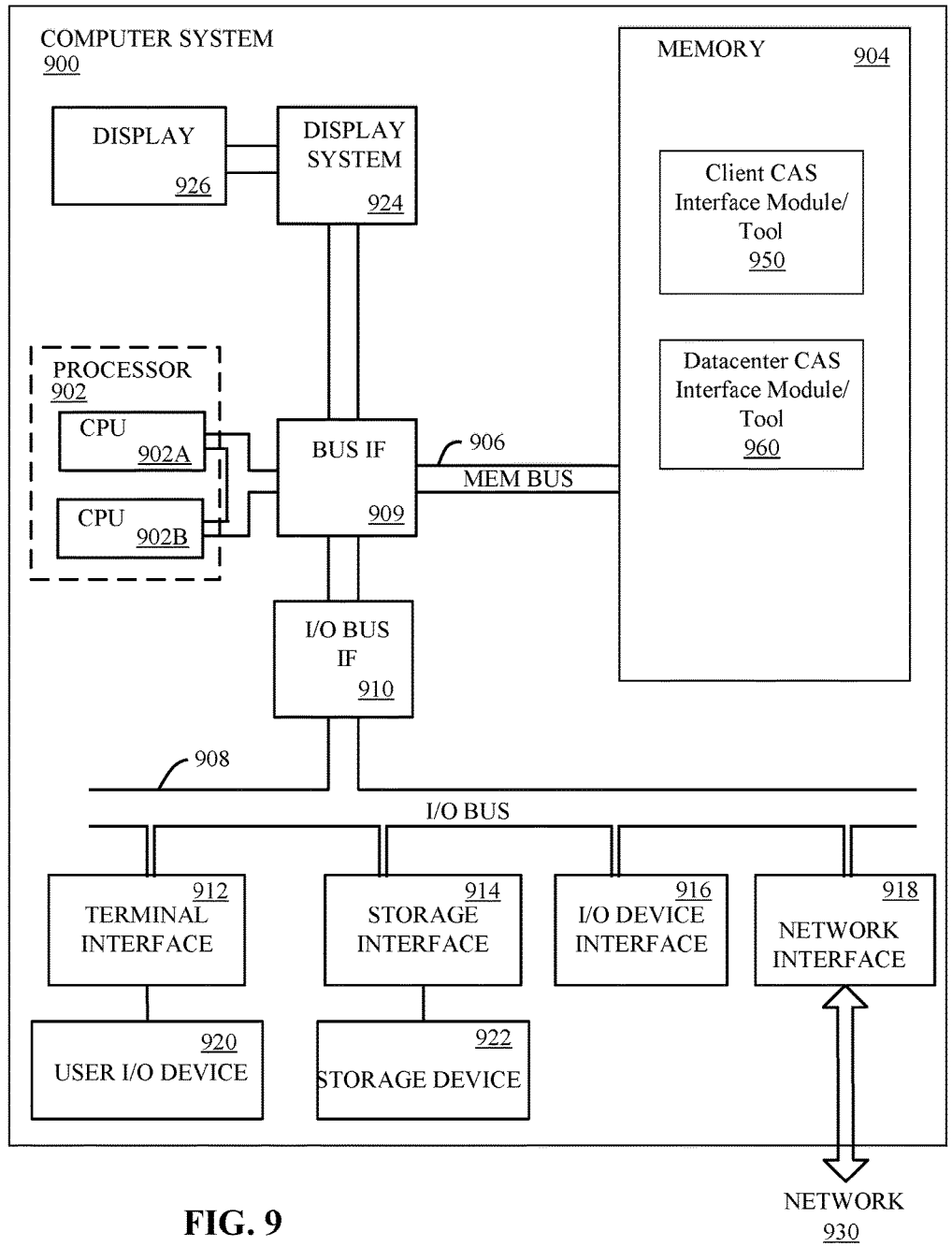
FIG. 9 depicts a block diagram of a computer system for implementing various embodiments.

FIG. 9 depicts a block diagram of a computer system for implementing various embodiments. The mechanisms and apparatus of the various embodiments disclosed herein apply equally to any appropriate computing system. The major components of the computer system 900 include one or more processors 902, a memory 904, a terminal interface 912, a storage interface 914, an I/O (Input/Output) device interface 916, and a network interface 918, all of which are communicatively coupled, directly or indirectly, for inter-component communication via a memory bus 906, an I/O bus 908, bus interface unit 909, and an I/O bus interface unit 910.

The computer system 900 may contain one or more general-purpose programmable central processing units (CPUs) 902A and 902B, herein generically referred to as the processor 902. In embodiments, the computer system 900 may contain multiple processors; however, in certain embodiments, the computer system 900 may alternatively be a single CPU system. Each processor 902 executes instructions stored in the memory 904 and may include one or more levels of on-board cache.

In embodiments, the memory 904 may include a random-access semiconductor memory, storage device, and/or storage medium (either volatile or non-volatile) for storing and/or encoding data and programs. In certain embodiments, the memory 904 represents the entire virtual memory of the computer system 900, and may also include the virtual memory of other computer systems coupled to the computer system 900 or connected via a network. The memory 904 can be conceptually viewed as a single monolithic entity, but in other embodiments the memory 904 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 904 may store all or a portion of the various programs, modules and data structures for processing data transfers as discussed herein. For instance, the memory 904 can store a client CAS interface tool or module 950 or datacenter CAS interface tool or module 960. Consistent with certain embodiments, these tools can be implemented as part of one or more database systems. These programs and data structures are illustrated as being included within the memory 904 in the computer system 900, however, in other embodiments, some or all of them may be on different computer systems and may be accessed remotely, e.g., via a network. The computer system 900 may use virtual addressing mechanisms that allow the programs of the computer system 900 to behave as if they only have access to a large, single storage entity instead of access to multiple, smaller storage entities. Thus, while the client CAS interface module 950 and the datacenter CAS interface module 960 are illustrated as being included within the memory 904, these components are not necessarily all completely contained in the same storage device at the same time. Further, although the client CAS interface module 950 and the datacenter CAS interface tool or module 960 are illustrated as being separate entities, in other embodiments some of them, portions of some of them, or all of them may be packaged together with other functions and modules.

In embodiments, the client CAS interface module 950 or the datacenter CAS interface tool or module 960 may include instructions or statements that execute on the processor 902 or instructions or statements that are interpreted by instructions or statements that execute on the processor 902 to carry out the functions as further described below. In certain embodiments, the client CAS interface module 950 or the datacenter CAS interface tool or module 960 can be implemented in hardware via semiconductor devices, chips, logical gates, circuits, circuit cards, and/or other physical hardware devices in lieu of, or in addition to, a processor-based system. In embodiments, the client CAS interface module 950 or datacenter CAS interface tool or module 960 may include data in addition to instructions or statements.

The computer system 900 may include a bus interface unit 909 to handle communications among the processor 902, the memory 904, a display system 924, and the I/O bus interface unit 910. The I/O bus interface unit 910 may be coupled with the I/O bus 908 for transferring data to and from the various I/O units. The I/O bus interface unit 910 communicates with multiple I/O interface units 912, 914, 916, and 918, which are also known as I/O processors (IOPs) or I/O adapters (IOAs), through the I/O bus 908. The display system 924 may include a display controller, a display memory, or both. The display controller may provide video, audio, or both types of data to a display device 926. The display memory may be a dedicated memory for buffering video data. The display system 924 may be coupled with a display device 926, such as a standalone display screen, computer monitor, television, or a tablet or handheld device display. In one embodiment, the display device 926 may include one or more speakers for rendering audio. Alternatively, one or more speakers for rendering audio may be coupled with an I/O interface unit. In alternate embodiments, one or more of the functions provided by the display system 924 may be on board an integrated circuit that also includes the processor 902. In addition, one or more of the functions provided by the bus interface unit 909 may be on board an integrated circuit that also includes the processor 902.

The I/O interface units support communication with a variety of storage and I/O devices. For example, the terminal interface unit 912 supports the attachment of one or more user I/O devices 920, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 920 and the computer system 900, and may receive output data via the user output devices. For example, a user interface may be presented via the user I/O device 920, such as displayed on a display device, played via a speaker, or printed via a printer.

The storage interface 914 supports the attachment of one or more disk drives or direct access storage devices 922 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 922 may be implemented via any type of secondary storage device. The contents of the memory 904, or any portion thereof, may be stored to and retrieved from the storage device 922 as needed. The I/O device interface 916 provides an interface to any of various other I/O devices or devices of other types, such as printers or fax machines. The network interface 918 provides one or more communication paths from the computer system 900 to other digital devices and computer systems; these communication paths may include, e.g., one or more networks 930.

Although the computer system 900 shown in FIG. 9 illustrates a particular bus structure providing a direct communication path among the processors 902, the memory 904, the bus interface 909, the display system 924, and the I/O bus interface unit 910, in alternative embodiments the computer system 900 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 910 and the I/O bus 908 are shown as single respective units, the computer system 900 may, in fact, contain multiple I/O bus interface units 910 and/or multiple I/O buses 908. While multiple I/O interface units are shown, which separate the I/O bus 908 from various communications paths running to the various I/O devices, in other embodiments, some or all of the I/O devices are connected directly to one or more system I/O buses.

In various embodiments, the computer system 900 is a multi-user mainframe computer system, a single-user system, or a server computer or similar device that has little or no direct user interface, but receives requests from other computer systems (clients). In other embodiments, the computer system 900 may be implemented as a desktop computer, portable computer, laptop or notebook computer, tablet computer, pocket computer, telephone, smart phone, or any other suitable type of electronic device.

FIG. 9 depicts a representative set of certain major components of the computer system 900. Individual components, however, may have greater complexity than represented in FIG. 9, components other than or in addition to those shown in FIG. 9 may be present, and the number, type, and configuration of such components may vary. Several particular examples of additional complexity or additional variations are disclosed herein; these are by way of example only and are not necessarily the only such variations. The various program components illustrated in FIG. 9 may be implemented, in various embodiments, in a number of different manners, including using various computer applications, routines, components, programs, objects, modules, data structures, etc., which may be referred to herein as software, computer programs, or simply programs.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the present disclosure has been described in terms of specific embodiments, it is anticipated that alterations and modifications thereof will become apparent to those skilled in the art. Therefore, it is intended that the following claims be interpreted as covering all such alterations and modifications as fall within the true spirit and scope of the disclosure.

What is claimed is:

1. A computer-implemented method for processing a request to access a logical location in a file stored in a non-transitory content addressable storage (CAS) system, the computer-implemented method comprising:

retrieving, in response to the request, first tree data from a first node in a first hash tree that represents a first version of the file, the first tree data including a first hash tree depth, a first CAS signature, a block size and a file size;

selecting, based on the first tree data, a second node from a higher level in the first hash tree;

retrieving second tree data from the second node in the first hash tree that represents the first version of the file, the second tree data including a second CAS signature;

determining that the second CAS signature matches a reserved CAS signature, wherein the reserved CAS signature represents a second version of the file;

retrieving, in response to determining the second CAS signature matches the reserved CAS signature, a third node in a second hash tree corresponding to the second node in the first hash tree, wherein the second hash tree represents the second version of the file;

retrieving third tree data from the third node in the second hash tree, the third tree data including a third hash tree depth, a third CAS signature, the block size and the file size; and traversing, based on the third tree data, the second hash tree to a leaf node corresponding to the logical location of the request; and transferring a data block corresponding to the leaf node of the second version of the file, and corresponding to the logical location of the request from the CAS system, to a second non-transitory computer readable storage medium.

2. The method of claim 1, wherein traversing, based on the third tree data, the second hash tree includes:

selecting, based on the third tree data, a fourth node from a higher level in the second hash tree;

retrieving fourth tree data from the fourth node, the fourth tree data including a fourth CAS signature;

determining that the fourth CAS signature does not match the reserved CAS signature and is a leaf of the second hash tree; and transferring, in response to determining that the fourth CAS signature does not match the reserved CAS signature and is a leaf of the second hash tree, a data block corresponding to the fourth node from the CAS system to the second non-transitory computer readable storage medium.

3. The method of claim 1, wherein the file is a disk image that corresponds to a file system with allocated and unallocated portions.

4. The method of claim 1, wherein selecting a second node from a higher level in the hash tree includes:

identifying a block within the file that corresponds to the logical location; and determining, based upon the block, a path through the hash tree.

5. The method of claim 1, wherein the reserved CAS signature is zero.

6. The method of claim 1, wherein retrieving the first tree data includes sending a request to a CAS datacenter.

7. The method of claim 6, further wherein the request is sent to a web accessible interface of the CAS datacenter.

8. A system for storing content addressable storage (CAS) signatures for different versions of a file, the system comprising:

a client device configured with a non-transitory computer readable storage medium, a client interface module, and a processor that is configured to:

generate a first hash tree for a first version of the file, the first hash tree having a first root CAS signature that is encoded with a depth for the first hash tree, a block size for the first hash tree and a file size for the file; and generate a second hash tree for a second version of the file by:

categorizing, relative to corresponding blocks in the first version of the file, a first set of one or more blocks in the second version of the file as modified and a second set of one or more blocks in the second version as unmodified, generating a first level of CAS signatures for the second hash tree by:

applying a hash function to the first set of one or more blocks categorized as modified, and applying a common CAS signature to the second set of one or more blocks categorized as unmodified, wherein the common CAS signature represents the first version of the file;

generating a second root CAS signature from the first level of CAS signatures, the second root CAS signature encoded with a depth for the second hash tree, a block size for the second hash tree and a file size for the file; and store the first hash tree and the second hash tree in the non-transitory computer readable storage medium, wherein the processor is further configured to restore one or more versions of the file responsive to a request from the client interface module.

9. The system of claim 8, further comprising generating a third hash tree for a third version of the file.

10. The system of claim 8, wherein the file is a disk image that corresponds to a file system with allocated and unallocated portions.

11. The system of claim 10, further comprising determining whether the blocks of the file are allocated or unallocated based upon directory information corresponding to the file system.

12. The system of claim 8, wherein the common CAS signature is a predetermined bit value.

13. The system of claim 12, wherein the common CAS signature is zero.

14. The system of claim 8, further comprising generating a root CAS signature for each hash tree.

15. The system of claim 8, wherein the client device comprises a computer of a CAS datacenter.

16. A computer program product for accessing data from a non-transitory content addressable storage (CAS) system storing different versions of a file, the computer program product comprising a computer readable storage medium having program instructions embodied therewith, the program instructions executable by a processor to cause the processor to:

retrieve, in response to a request to access a logical location of the file, first tree data from a first node in a first hash tree that represents a first version of the file, the first tree data including a first hash tree depth, a first CAS signature, a block size and a file size;

select, based on the first tree data, a second node from a higher level in the first hash tree;

retrieve second tree data from the second node in the first hash tree that represents the first version of the file, the second tree data including a second CAS signature;

determine that the second CAS signature matches a reserved CAS signature, wherein the reserved CAS signature represents a second version of the file;

retrieve, in response to determining the second CAS signature matches the reserved CAS signature, a third node in a second hash tree corresponding to the second node in the first hash tree that represents the second version of the file;

retrieve third tree data from the third node in the second hash tree, the third tree data including a third hash tree depth, a third CAS signature, the block size and the file size;

traverse, based on the third tree data, the second hash tree to a top-level node corresponding to the request to access the logical location; and output a block corresponding to the top-level node responsive to the request.

17. The computer program product of claim 16, wherein the program instructions are further configured to further cause the processor to:

receive a plurality of versions of a file;
generate the first hash tree for a first version of the file, the first hash tree having a first root CAS signature that is encoded with a depth for the first hash tree, the block size for the first hash tree and the file size for the file; and
generate the second hash tree for the second version of the file by:
 categorizing, relative to corresponding blocks in the first version of the file, a first set of one or more blocks in the second version of the file as modified and a second set of one or more blocks in the second version as unmodified;
 generate a first level of CAS signatures for the second hash tree by:
  applying a hash function to the first set of one or more blocks categorized as modified, and
  applying a common CAS signature to the second set of one or more blocks categorized as unmodified;
 generate a second root CAS signature from the first level of CAS signatures, the second root CAS signature encoded with a depth for the second hash tree, a block size for the second hash tree and a file size for the file; and
 store the generated hash trees and CAS signatures in the CAS system.

18. The computer program product of claim 17, wherein the program instructions are further configured to further cause the processor to:
 in response to receiving a new version of a file, generate a difference report identifying changes in the new version of the file relative to a previous version of the file;
 identify unmodified blocks of the file relative to the previous version of the file and based on the difference report;
 apply the reserved CAS signature to the identified unmodified blocks; and
 generate a hash tree for the new version of the file.

19. The computer program product of claim 16, wherein the program instructions configured to cause the processor to traverse the second hash tree to a top-level node are further configured to further cause the processor to:
 select a node from a higher level in the second hash tree;
 determine the selected node is a top-level node;
 in response to determining the selected node has a CAS signature not matching the reserved CAS signature, retrieving a block associated with the selected node; and
 in response to determining that the selected node has a CAS signature matching the reserved CAS signature, selecting a corresponding node in a hash tree representing a previous version of the file; and
 retrieve a block associated with the corresponding node.

20. A computer program product for storing content addressable storage (CAS) signatures for different versions of a file, the computer program product comprising a computer readable storage medium, having program instructions embodied therewith, the program instructions executable by a processor to cause the processor to:
 generate a first hash tree for a first version of the file, the first hash tree having a first root CAS signature that is encoded with a depth for the first hash tree, a block size for the first hash tree and a file size for the file; and
 generate a second hash tree for a second version of the file by:
  categorizing, relative to corresponding blocks in the first version of the file, a first set of one or more blocks in the second version of the file as modified and a second set of one or more blocks in the second version as unmodified,
  generating a first level of CAS signatures for the second hash tree by:
   applying a hash function to the first set of one or more blocks categorized as modified, and
   applying a common CAS signature to the second set of one or more blocks categorized as unmodified, wherein the common CAS signature represents the first version of the file;
  generating a second root CAS signature from the first level of CAS signatures, the second root CAS signature encoded with a depth for the second hash tree, a block size for the second hash tree and a file size for the file; and
 store the first hash tree and the second hash tree, wherein the program instructions are further configured to cause the processor to restore one or more versions of the file responsive to a request.

\* \* \* \* \*